(12) United States Patent
Arthanari et al.

(10) Patent No.: US 11,900,206 B2
(45) Date of Patent: Feb. 13, 2024

(54) UTILIZATION OF A BARCODE READER TO DETECT A PRINTING ANOMALY

(71) Applicant: ZEBRA TECHNOLOGIES CORPORATION, Lincolnshire, IL (US)

(72) Inventors: Ramesh Kumar Arthanari, Namakkl (IN); Sajan Wilfred, Kollam (IN); Vasantha Bharathi Ayyappan, Chennai (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/443,771

(22) Filed: Jul. 27, 2021

(65) Prior Publication Data

US 2023/0036254 A1 Feb. 2, 2023

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .................. G06K 7/1413; G06K 7/10722
USPC .................................... 235/462.41
See application file for complete search history.

(56) References Cited

U.S. PATENT DOCUMENTS

2020/0393998 A1* 12/2020 Su .................. G06F 3/1208

* cited by examiner

*Primary Examiner* — Toan C Ly (57) ABSTRACT

A barcode reader for detecting a printing anomaly is described herein. The barcode reader may receive read data associated with a read operation involving a barcode reader and a barcode. The barcode reader may process, using an anomaly detection model, the read data to determine an anomaly status associated with the barcode being printed by a printer. The anomaly detection model may be trained based on reference decoding metric information associated with corresponding reference images that depict barcodes associated with one or more printing anomalies. The barcode reader may determine, based on the anomaly status, a printer status associated with the printer. The barcode reader may provide an indication of the printer status.

12 Claims, 7 Drawing Sheets

UTILIZATION OF A BARCODE READER TO DETECT A PRINTING ANOMALY

BACKGROUND

Barcodes can be associated with various types of objects to provide or permit information to be obtained about the objects using a barcode reader. The barcodes may be printed (e.g., onto labels that attach to the objects) by a printer. Over time, wear and tear on the printer may degrade a quality of printed barcodes and/or cause printing anomalies that prevent a barcode reader from being able to decode a barcode. To ensure that a printer is capable of printing a barcode that can be decoded by a barcode reader, there is a need to detect or predict when a printer may require service or maintenance to avoid printing barcodes that cannot be decoded by a barcode reader.

SUMMARY

Some implementations described herein relate to a method. The method may include performing, by a barcode reader, a read operation associated with reading a barcode. The method may include receiving, by the barcode reader, read data associated with the read operation, where the read data includes image data associated with one or more images captured in association with the read operation and decoding metric information associated with decoding the barcode based on the one or more images. The method may include processing, by the barcode reader and using an anomaly detection model, the read data to determine an anomaly status associated with the barcode being printed by a printer, where the anomaly detection model is trained based on reference decoding metric information associated with reference images that depict barcodes associated with one or more printing anomalies. The method may include determining, by the barcode reader and based on the anomaly status, a printer status associated with the printer. The method may include providing, by the barcode reader, an indication associated with the printer status.

Some implementations described herein relate to a device. The device may include one or more memories and one or more processors coupled to the one or more memories. The one or more processors may be configured to receive read data associated with a read operation involving a barcode reader and a barcode, wherein the read data includes image data associated with one or more images captured in association with the read operation, and decoding metric information associated with decoding the barcode based on the one or more images. The one or more processors may be configured to process, using an anomaly detection model, the read data to determine an anomaly status associated with the barcode being printed by a printer. The one or more processors may be configured to determine, based on the anomaly status, a printer status associated with the printer. The one or more processors may be configured to provide, to a user device or the barcode reader, an indication of the printer status.

Some implementations described herein relate to a system comprising. The system may include a barcode reader a printer; and. The one or more processors may be configured to cause the barcode reader to perform a read operation associated with reading a barcode. The one or more processors may be configured to receive, from the barcode reader, read data associated with the read operation. The one or more processors may be configured to process, using an anomaly detection model, the read data to determine an anomaly status associated with the barcode being printed by a printer. The one or more processors may be configured to provide an indication associated with the printer status.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Barcodes are commonly used to provide and/or obtain information associated with certain objects (e.g., products, inventory, samples, supplies, consumables, and/or the like). For example, a barcode reader can be used to decode a barcode that is attached to (or associated with) an object to permit a system (e.g., associated with an enterprise or organization) to obtain information associated with the object. In some cases, the barcode is created and/or generated on a label using a printer and/or created or generated directly on an object using an etching device. Over time, a print quality of a barcode may degrade due to wear and tear on the printer. However, degradation of a print quality of a barcode may not be detected until an issue with a printer gets so severe that printed barcodes are unreadable (e.g., by a technician and/or an automated self-maintenance operation). In such cases, the printer may need to be shut down for servicing, which results in delays and/or other costs associated with generating barcodes for objects.

In some cases, the print quality of a barcode may be analyzed using an image processing technique that analyzes an image of a barcode to detect anomalies within the barcode. Such processing techniques are relatively compute intensive and can be relatively inaccurate when detecting that a printer is experiencing an issue that will result in unreadable barcodes or predicting that the printer is about to experience such an issue. Accordingly, there is a need for a system that is capable of accurately detecting, based on a printed barcode, that a printer that printed the barcode is experiencing an issue and/or predicting that the printer is about to experience an issue (e.g., within a threshold time period or within a threshold quantity of print operations).

Some implementations described herein provide a printer management system that utilizes a barcode reader to accurately detect and/or predict a printing anomaly associated with a printer. For example, the printer management system may utilize and/or provide an anomaly detection model that is configured to detect a printing anomaly based on read data that is generated based on a read operation performed on the barcode by the barcode reader. The read data may include decoding metric information that is associated with the barcode reader decoding (or attempting to decode) the barcode based on one or more images of the barcode. The anomaly detection model may detect and/or predict an issue associated with a printer using relatively fewer resources than an image processing technique because decoding metric information may require less computing resources (e.g., processor resources and/or memory resources). In some implementations, the read data may include the image data in association with the read data to permit the anomaly detection model to detect whether certain decoding metric information corresponds to certain printing anomalies involving the barcodes. In such a case, the anomaly detection model may more accurately detect (and/or predict) an issue associated with a printer relative to systems that utilize image processing without using read data associated with decoding (or attempting to decode) a barcode to detect an issue.

In this way, a printer management system and/or a barcode reader, as described herein, may quickly and/or accurately detect an issue associated with a printer (and/or detect that a printer is about to experience an issue within a threshold time period or within a threshold quantity of print operations) using read data associated with a barcode that was printed by the printer. Accordingly, as described herein, the printer management system and/or the barcode reader may reduce a likelihood that a printer experiences a severe enough issue that would require the printer to be shut down (e.g., during a production run), thereby improving efficiency of the printer (e.g., by enabling scheduling of maintenance during planned shutdowns or slow production run) and enabling more accurate predictions for maintenance requirements and/or appropriately schedule maintenance on the printer. Moreover, the printer management system and/or the barcode reader may analyze read data that can more quickly or more accurately detect a printing anomaly associated with a barcode that is printed by a printer (e.g., a printing anomaly that is indicative of the printer experiencing a particular issue).

A barcode, as described herein, may include a one-dimensional barcode (e.g., a parallel line barcode), a two-dimensional (2D) barcode (e.g., a quick response (QR) code), or any other marking that is configured to be decoded by a barcode reader, as described herein. Further, while certain examples described herein may be described in connection with a printer that generates a printed barcode (e.g., a parallel line barcode and/or a QR code) or other type of printed indicia, such examples may similarly apply to an etching device that generates an etched barcode, such as a direct part marking (DPM), or any other type of etched indicia. Correspondingly, a printer, as used herein, may include and/or be associated with an etching device that includes an etching component to generate an etched barcode. Moreover, for implementations involving an etching device or etching component, printing a barcode may correspond to "etching" a barcode, and/or a "printing issue" may corresponding to an "etching issue" associated with an etching device or etching component.

A barcode reader, as used herein, may include a manually controlled device that is configured to be held by and/or attached to a user and triggered (e.g., using a button or other input device) by the user to read (or scan) a barcode. Additionally, or alternatively, the barcode reader may include an automated device that can continuously monitor an environment of the barcode reader and automatically read detected barcodes when the barcodes are placed within a field of view of an image sensor of the barcode reader. The image sensor may include a camera, a scanner (e.g., a laser scanner or optical scanner), or other type of image sensor device that is capable of reading a barcode in association with a read operation by the barcode reader.

Figure 1:
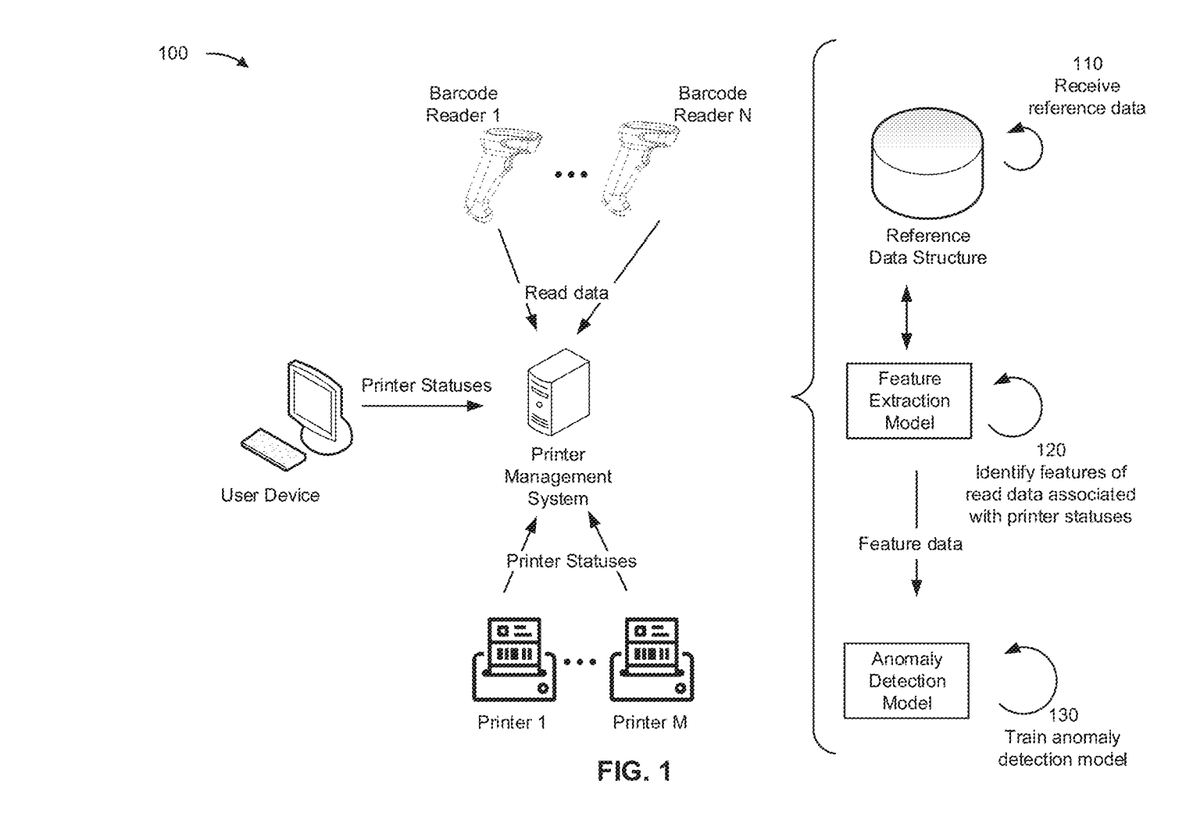
FIG. 1 is a diagram of an example implementation associated with an anomaly detection model described herein.

FIG. 1 is a diagram of an example implementation 100 associated with an anomaly detection model described herein. As shown in FIG. 1, example implementation 100 includes a printer management system, N barcode readers (shown as Barcode Reader 1 through Barcode Reader N, N≥1), M printers (shown as Printer 1 through Printer M, M≥1), and a user device. These devices are further described below, at least in connection with FIG. 5 and FIG. 6.

In example implementation 100, the printer management system includes a reference data structure, a feature extraction model, and an anomaly detection model. As described herein, the printer management system (and/or another associated system) may train the anomaly detection model based on historical read operations performed by one or more of the barcode readers and/or printer statuses associated with the corresponding printers that printed respective barcodes that were read during the historical read operations.

As shown in FIG. 1, and by reference number 110, the printer management system receives reference data. The reference data may include read data from the one or more barcode readers and/or printer statuses from the printer and/or printer status from the user device. The read data may be associated with historical read operations performed by one or more of the barcode readers. For example, the read data may indicate or be associated with certain processing techniques and/or operations that were performed to decode and/or read a barcode (e.g., a printed barcode and/or an etched barcode). The processing techniques may include any suitable techniques to edit and/or analyze an image of a barcode to decode the barcode.

The read data may include reference decoding information, from the historical read operations, that is associated with reference images of barcodes (e.g., reference images that depict barcodes associated with certain printing anomalies). The reference decoding metric information may identify values for decoding metrics associated with corresponding historical read operations (e.g., a Boolean value that is indicative of whether the barcode was successfully decoded, a quantity of images that were captured to successfully decode the barcode, and/or a quantity of images that were captured that did not result in a successful decode of the barcode, values associated with types of processing techniques performed during a read operation).

In some implementations, the read data may include image data associated with one or more reference images captured in association with the historical read operations. For example, the reference images may depict barcodes that are read during the historical barcode operations. In some implementations, the reference images (or a subset of the references images) may depict barcodes that are associated with and/or include one or more printing anomalies. In this way, the decoding metric information can be associated with reference images within the read data, to permit the feature extraction model to identify features associated with the read data, printing anomalies, and/or printer statuses, as described elsewhere herein.

The printer statuses may be associated with historical conditions of the printers during a time period associated with the printers printing the barcodes (e.g., the barcodes that were read by the barcode readers during the historical read operations). As shown, the printer statuses may be received from the printers (e.g., based on the printers experiencing an error within a threshold time period after printing the barcodes). Additionally, or alternatively, the printer statuses may be indicated by a user via the user device (e.g., in association with a supervised learning technique). The printer statuses may identify one or more types of printing issues (or errors) experienced by the printers during a time period associated with the printers printing the barcodes. For example, such printing issues may include clogged print heads, misaligned printheads or other components of the printer, wrinkled printing media that receives the printed barcodes, and/or development of dust or other printing inhibitors, among other examples.

As further shown in FIG. 1, and by reference number 120, a feature extraction model identifies features of read data associated with printer statuses. For example, the feature extraction model may be configured to recognize a trend and/or a pattern associated with certain read data being associated with certain printer statuses and/or certain printing anomalies.

In some implementations, the feature extraction model may be associated with a machine learning model (e.g., a support vector machine, a regression model, a neural network, a clustering model, a prediction model, and/or a generator model). For example, the printer management system may use a classification model (e.g., a clustering model and/or a regression model) to classify the read data (e.g., certain decoding metric information) into a particular class. Relative to a printing issue, a first class may be associated with barcodes that were printed by a printer having a first printing issue or prior to the printer having the first printing issue, a second class may be associated with barcodes that were printed by a printer having a second printing issue or prior to the printer having the second issue, and so on.

In some implementations, the feature extraction model may be configured to map read data from one or more of the barcode readers to a certain printing anomaly identified in a barcode that is printed by one of the printers. For example, the feature extraction model may include or be associated with a computer vision model (e.g., a convolutional neural network) that is configured to classify the image data into a particular class. The image data may be associated with reference images that depict barcodes relating to certain printing anomalies. A first class may be associated with barcodes that were printed with a first type of printing anomaly, a second class may be associated with barcodes that were printed with a second type of printing anomaly, and so on. In some implementations, the computer vision model may utilize an image recognition technique (e.g., an Inception framework, a ResNet framework, a Visual Geometry Group (VGG) framework, and/or the like), and/or an object detection technique (e.g., a Single Shot Detector (SSD) framework, a You Only Look Once (YOLO) framework, and/or the like), among other examples. Types of printing anomalies may include a barcode degradation associated with a light print or faded print, barcode distortion, barcode damage associated with broken bars or lines of a barcode, quiet zone violations, low contrast barcodes, print/mark inconsistency, grid non-uniformity, axial non-uniformity, and/or a poor or low barcode grade (e.g., a barcode grade that is below a certain threshold associated with a standard).

The feature extraction model may output and/or provide feature data to the anomaly detection model. The feature data may include sets of reference decoding metric information that are determined to be associated with certain printer statuses and/or sets of reference decoding metric information that are determined to be associated with certain printing anomalies that are identified in barcodes.

As further shown in FIG. 1, and by reference number 130, the printer management system trains the anomaly detection model. For example, the printer management system may train the anomaly detection model based on the identified features of read data being associated with certain printer statuses (which may be indicated by the user devices and/or printers).

The anomaly detection model may be trained to identify read data that is associated with and/or corresponds to a particular printing anomaly that is indicative of a printer experiencing an issue. The issue may be one of a plurality of types of issues that are likely to cause the printer to print unreadable barcodes during subsequent printing operations (e.g., subsequent printing operations performed within a threshold time period and/or subsequent printing operations that would be within a next threshold quantity of printing operations). For example, the printer management system may train the machine learning model based on the reference data associated with historical read operations (e.g., reference images and/or corresponding reference decoding metric information). In some implementations, the anomaly detection model may be trained to identify (e.g., using a computer vision model) patterns and/or trends associated with performance of tasks of an operation depicted in the videos (e.g., based on timestamp data and/or other metadata associated with the videos). Additionally, or alternatively, the anomaly detection model may be trained to identify (e.g., using a computer vision model) patterns or trends of utilizing and/or interacting with certain physical objects during performance of one or more tasks of an operation.

In some implementations, the printer management system may receive the anomaly detection model from another system after the printer management system is trained. For example, the other system may obtain the videos of historical performances of Operation A and/or operation information associated with Operation A and provide the anomaly detection model to the printer management system to permit the printer management system to utilize the anomaly detection model. Additionally, or alternatively, the anomaly detection model may be configured to be locally installed on a wearable device for use, as described elsewhere herein. The anomaly detection model may be trained and/or utilized as described in more detail in connection with FIG. 3.

The anomaly detection model may learn and/or maintain sets of reference decoding metric information that are associated with a printer status that is indicative of whether the printer is experiencing an issue that potentially could affect a quality of subsequently printed barcodes (or and/or etched barcodes). In this way, the anomaly detection model may be trained and/or configured to be used to analyze read data associated with a barcode to monitor and/or determine a printer status associated with a printer printing one or more barcodes (as further described at least in connection with FIG. 2).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
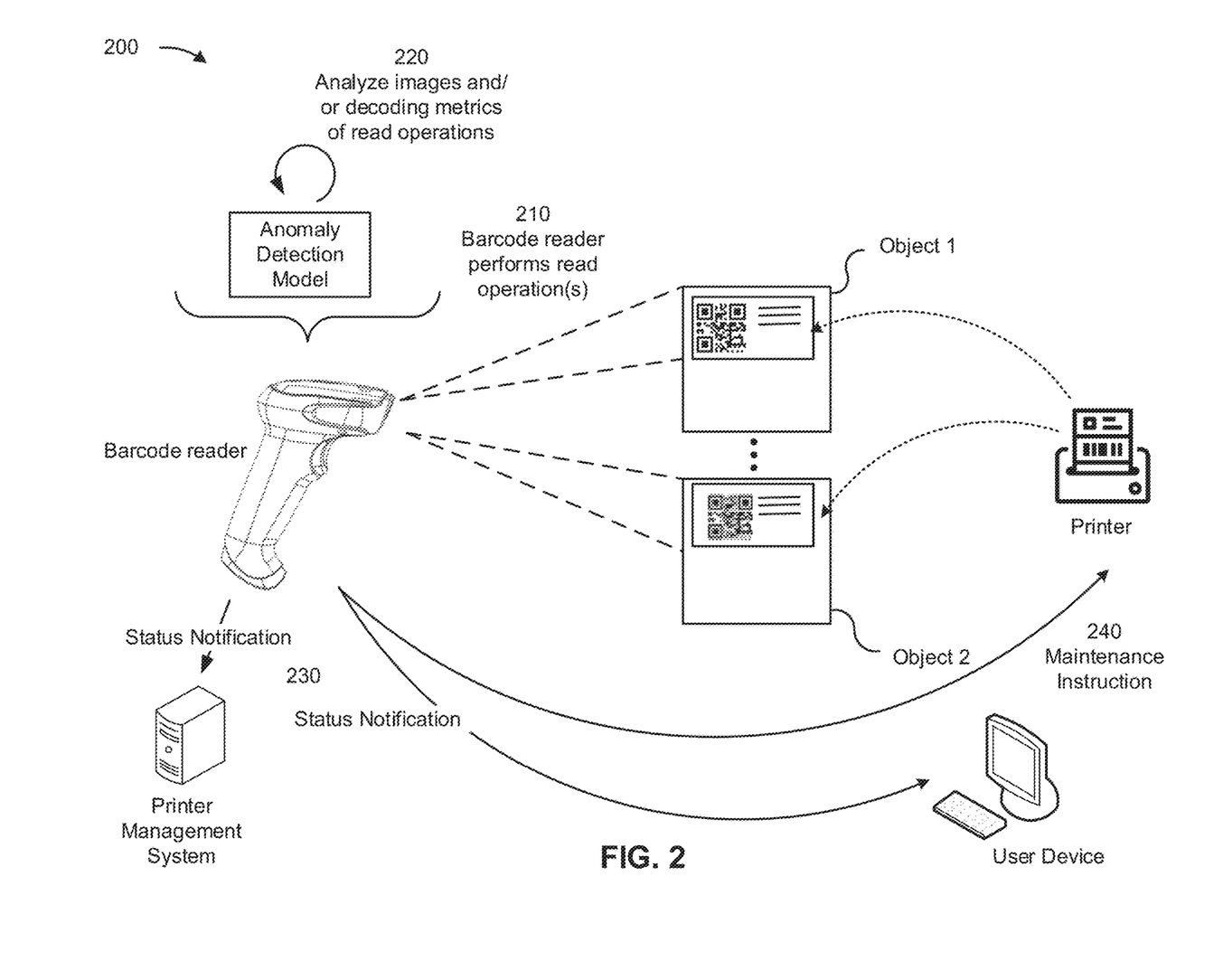
FIG. 2 is a diagram of an example implementation of utilizing a barcode reader to detect a printing anomaly, as described herein.

FIG. 2 is a diagram of an example implementation 200 associated with utilizing a barcode reader to detect a printing anomaly. As shown in FIG. 2, example implementation 200 includes a barcode reader, a printer management system, a printer, and a user device. These devices are described in more detail below in connection with FIG. 5 and FIG. 6. In example implementation 200, the printer may have printed a first label that is attached to a first object (Object 1) and a second label that is attached to a second object (Object 2). The first label and the second label may be referred to collectively as "the labels."

As shown in FIG. 2, and by reference number 210, the barcode reader performs one or more read operations. To perform a read operation, the barcode reader may capture, via a camera of the barcode reader, an image that depicts the barcode. The barcode reader may process the image (e.g., according to any suitable preprocessing techniques that are associated with a type or performance capability of the barcode reader) to identify a depiction of the barcode within the image. The barcode reader may perform a decoding operation of the barcode based on pixel values of the barcode (e.g., according to any suitable decoding techniques configured within the barcode reader). The barcode reader may decode the barcode, as depicted (e.g., in the depiction of the barcode within the image), in order to obtain decoding metric information associated with the read operation.

As described herein, the decoding metric information may be associated with one or more metrics involved in decoding (or attempting to decode) a barcode. For example, the decoding metric information may indicate a quantity of images that were captured to successfully decode the barcode or a quantity of images that were captured that did not result in a successful decode of the barcode. The decoding metric information may indicate an autotuning technique that was used to modify an image used in a decoding operation that successfully decoded the barcode or an autotuning technique associated with one or more decoding operations that were not successful in decoding the barcode. The decoding metric information may indicate a setting (e.g., zoom, resolution, and/or aspect ratio) of a camera of the barcode reader used to capture an image used in a decoding operation that successfully decoded the barcode or a setting of a camera of the barcode reader used to capture an image used in one or more decoding operations that were not successful in decoding the barcode.

In example implementation 200, the barcode reader may perform a first read operation of a first barcode on the first label, and the barcode reader may perform a second read operation of a second barcode on the second label. The first barcode may be intended to have a same coding configuration as the second barcode (e.g., the printer prints the first barcode and the second barcode according to a same file or instruction). However, as shown, the first barcode may be a higher quality barcode than the second barcode (e.g., the second barcode is shown to be blurrier than the first barcode). Accordingly, as described herein, the first barcode may not be associated with a printing anomaly or may have been printed by the printer when the printer was not experiencing an issue, and the second barcode may be associated with a printing anomaly or may have been printed by the printer when the printer was experiencing an issue (e.g., an issue that causes blurring of the barcode).

As described herein, a read operation may be performed based on a user input that is received via an input component of the barcode reader (e.g., a button or other type of user interface) and that is configured to trigger the read operation. Accordingly, in example implementation 200, a user may trigger the read operations in association with receiving the objects and/or performing an analysis of the barcodes on the labels (e.g., to potentially diagnose an issue with the printer). In some implementations, the read operation may be automatically performed based on a label being printed by a printer. Accordingly, the read operation may be performed by the barcode reader based on the barcode reader detecting that the printer printed the barcode (e.g., because the label is fed into a field of view of an image sensor of the barcode reader).

In some implementations, to track and/or identify that read data is associated with a barcode from a particular printer, the first label and/or the second label may be associated with the printer. For example, the user may indicate (e.g., using a printer identifier) that the printer printed the first label and the second label. Additionally, or alternatively, the labels may indicate (e.g., by printing a printer identifier on the labels) that the printer printed the first label and the second label. In some implementations, the barcode reader may automatically read the barcode (e.g., based on detecting that the label is within a field of view of an image sensor of the barcode reader). Additionally, or alternatively, the barcode reader may receive a request to perform the read operation in association with a printer identifier that identifies the printer. For example, the barcode reader may receive the request based on the printer outputting a label to in order to determine whether the printer is experiencing a printing issue described herein. In this way, the printer may be tracked, monitored, and/or analyzed in association with barcodes on the labels.

As further shown in FIG. 2, and by reference number 220, the barcode reader analyzes images and/or decoding metrics of read operations. For example, the barcode reader may utilize the anomaly detection model to analyze the first barcode and the second barcode. To permit the barcode reader to use the anomaly detection model to diagnose potential issues with printers that printed barcodes and/or etched barcodes, the barcode reader may have received (e.g., downloaded) the anomaly detection model from the printer management system (e.g., after the anomaly detection model was trained as described elsewhere herein) and installed the anomaly detection model within the barcode reader.

The barcode reader, using the anomaly detection model, may process the read data to determine an anomaly status associated with the barcode being printed by a printer. For example, the anomaly status may indicate whether the barcode includes a particular printing anomaly. Additionally, or alternatively the anomaly status may include whether the barcode is associated with or includes one or more particular types of printing anomalies from the one or more printing anomalies that the anomaly detection model is trained to identify. The barcode reader may determine, based on the anomaly status, a type of printer status associated with the printer. For example, based on the anomaly detection model processing the decoding metric information for a read operation and the anomaly status, the barcode reader may accurately predict whether the printer is experiencing or likely to experience an issue that may result in the printer printing unreadable barcodes (e.g., within a threshold time period or within a threshold number of labels). For example, the printer status may indicate a type of the printing issue that is associated with the particular printing anomaly. In this way, the anomaly detection model, based on the read data and/or the anomaly status, may permit the printer, a user of the user device, and/or a technician to perform corresponding maintenance to address and/or mitigate that type of printing issue, as described elsewhere herein.

Referring to the example barcodes of FIG. 2, the barcode reader may utilize the anomaly detection model to determine, from read data associated with the first read operation, that the printer is not experiencing or is not likely to experience an issue associated with printing readable barcodes within a subsequent threshold time period (e.g., because the read data and/or anomaly status may indicate that the first read operation involved a relatively quick and/or efficient decoding of the barcode, due to the high print quality of the barcode). On the other hand, the barcode reader may utilize the anomaly detection model to determine, from read data associated with the second read operation, that the printer is experiencing or is likely to experience an issue associated with printing readable barcodes within a subsequent threshold time period (e.g., because the read data and/or anomaly status may indicate that the second read operation involved a set of decoding metrics that are indicative of a printer status associated with a particular printing issue).

As further shown in FIG. 2, and by reference number 230, the barcode reader provides a status notification to a user device. For example, for the first read operation, the status notification may include an indication that the printer printed the barcode without any apparent printing issues (e.g., because the barcode may have been easily decoded during the first read operation). For the second read operation, the barcode reader may transmit, to the printer management system and/or the user device, a notification that identifies the printer status (and/or the anomaly status) and/or indicates that the printer is likely to print unreadable barcodes (and/or that the printer is printing unreadable barcodes) due to a particular printing issue (which may be specified in the notification). The status notification may identify the printer status in association with the printer identifier associated with the printer. Accordingly, the printer management system may track the printer status in association with managing the printer in example implementation 200 (e.g., to schedule maintenance of the printer prior to the printer outputting unreadable barcodes).

In some implementations, the printer management system may retrain the anomaly detection model (or an instance of the anomaly detection model on the printer management system) according to the status notification and/or feedback (e.g., from a user of the barcode reader, from a user of the user device, and/or a model associated with an unsupervised learning technique). Accordingly, the anomaly detection model may be configured to be updated based on a read operation and feedback associated with an indication in a status notification.

Additionally, or alternatively, the user device may indicate, to a user, that the printer is likely experiencing a printing issue and/or is likely to be unable to print a readable barcode due to a particular printing issue to permit the user to service (e.g., provide maintenance to) the printer to address the printing issue.

In some implementations, the barcode reader may indicate the status notification and/or an alert regarding a particular printer status via a user interface (e.g., a display) of the barcode reader. For example, if the anomaly detection model indicates that the printer is likely experiencing a printing issue, then the barcode reader may alert a user of the barcode reader via the user interface to permit the user of the barcode reader to address the printer issue and/or notify a technician to address the printer issue.

As further shown in FIG. 2, and by reference number 240, the barcode reader may provide a maintenance instruction to the printer. For example, if the barcode reader determines that the printing anomaly is associated with a printhead, the barcode reader may instruct the printer to perform a printhead cleaning operation or other type maintenance operation to mitigate the printing issue and/or reduce a likelihood that the printer develops the printing issue and/or prints unreadable barcodes caused by the printing issue.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
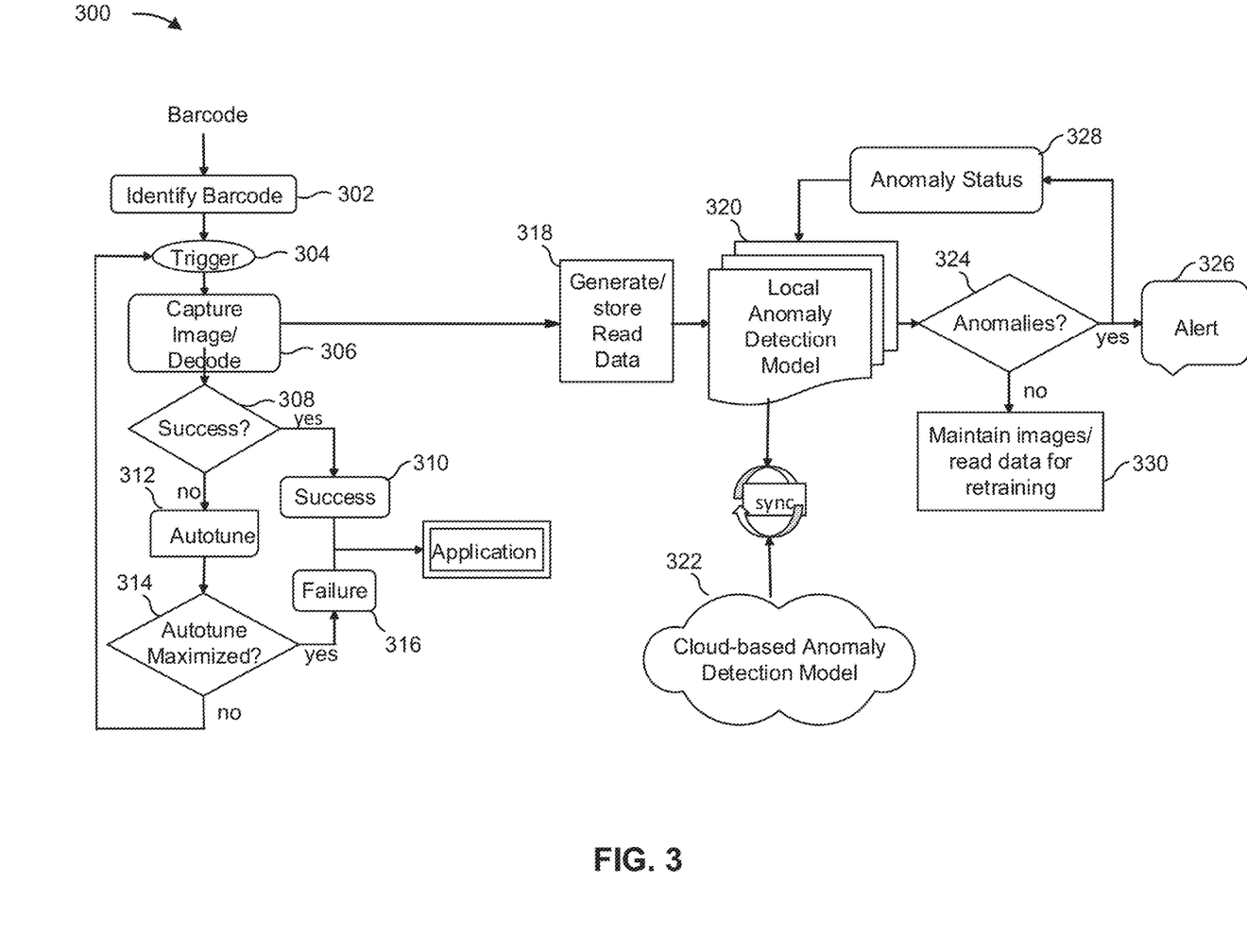
FIG. 3 is a flow diagram of an example implementation of utilizing a barcode reader to detect a printing anomaly, as described herein.

FIG. 3 is a flow diagram of an example implementation 300 associated with utilizing a barcode reader to detect a printing anomaly. As shown in FIG. 3, example implementation 300 includes a barcode reader and a printer management system. In example implementation 300, certain process blocks may be described as being performed by the barcode reader or the printer management system, however, in other examples, the barcode reader and/or the printer management system may similarly perform any or all of the process blocks described herein.

As shown in FIG. 3, and by block 302, the barcode reader may identify a barcode. The barcode reader, as shown by block 304, may trigger a read operation. The read operation, as shown by block 306, may include capturing images and/or decoding the barcodes as depicted in the images. As shown by block 308, the barcode reader may determine whether a decoding operation of the read operation is successful. If the decoding operation is successful, as shown by block 310, the barcode reader may indicate success to an application used to track information associated with barcodes (e.g., information associated with the objects of FIG. 2). If the decoding operation is not success, as shown by block 312, the barcode reader may autotune the image (according to any suitable autotuning technique). As shown by block 314, the barcode reader may determine whether the autotuning technique has been maximized for the read operation. For example, the read operation may iteratively be performed for less than or equal to a threshold quantity of autotuning iterations (which may correspond to a threshold quantity of images analyzed during a read operation). Accordingly, if the maximum quantity of autotuning iterations is not met, then control may return to block 304 to recapture an image with autotuned settings. If the maximum quantity of iterations is met, then the barcode reader may indicate, to the application, a failure to decode the barcode reader, as shown by block 316.

As shown by block 318, the barcode reader may generate and/or store read data associated with the read operation (which may correspond to the iterative processing of blocks 304 between 316). Accordingly, the read data may include a quantity of autotuning iterations that were processed, types of autotuning operations that were processed (e.g., settings of camera during the autotuning operations), a quantity of images that were captured (which may correspond to the quantity of autotuning iterations), and/or whether or not the read operation was successful. As shown by block 320, a local anomaly detection model of the barcode reader may process the read data to identify printing anomalies associated with a printer that printed the barcode. As shown by block 322, a cloud-based anomaly detection model of the printer management system may be synchronized with the local anomaly detection model. For example, if the local anomaly detection model does not have available computing resources to process the read data (e.g., due to an amount of the read data), the barcode reader may request the printer management system to process the read data and/or a subset of the read data.

If, at block 324, the barcode reader detects any anomalies associated with the read data, the barcode reader may transmit an alert (and/or another device, such as the printer management system), as shown by block 326 (e.g., a notification regarding the detected printing anomaly). Additionally, or alternatively, as shown by block 328, the barcode reader may feed the anomaly status back to the local anomaly detection model for storage with the corresponding read data to permit the local anomaly detection models to be retrained according to the anomaly status and/or the read data.

If, at block 324, the barcode reader does not detect any printing anomalies in the images and/or from the read data, as shown in block 330, the barcode reader may maintain the images and/or the read data for retraining the local anomaly detection models and/or the cloud-based anomaly detection model.

As indicated above, FIG. 3 is provided as an example. Other examples may differ from what is described with regard to FIG. 3.

Figure 4:
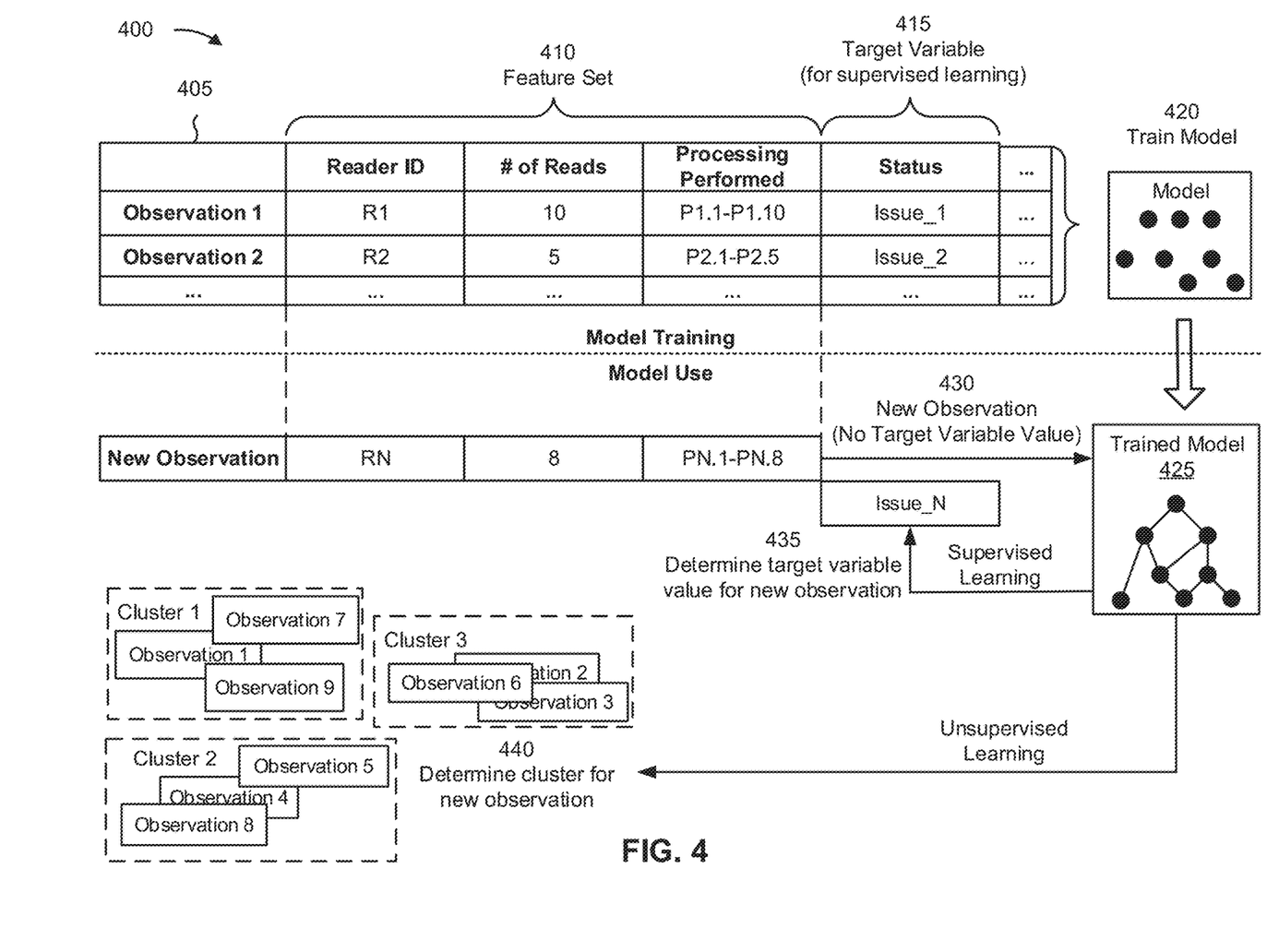
FIG. 4 is a diagram illustrating an example of training and using a machine learning model described herein.

FIG. 4 is a diagram illustrating an example 400 of training and using a machine learning model in connection with detecting a printing anomaly associated with a barcode using a barcode reader. The machine learning model training and usage described herein may be performed using a machine learning system. The machine learning system may include or may be included in a computing device, a server, a cloud computing environment, or the like, such as a barcode reader and/or a printer management system described in more detail elsewhere herein.

As shown by reference number 405, a machine learning model may be trained using a set of observations. The set of observations may be obtained from training data (e.g., reference data), such as data gathered during one or more processes described herein. In some implementations, the machine learning system may receive the set of observations (e.g., as input) from one or more barcode readers and/or a reference data structure that received the set of observations from the one or more barcode readers, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more barcode readers and/or a user device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a reader identifier ("Reader ID"), a second feature of a quantity of reads ("# of Reads"), a third feature of processing techniques performed in association with the reads ("Processing Performed"), and so on. The reader identifier may be indicative of a type of reader (e.g., a camera-based and/or a scanner-based), a capability of a reader (e.g., a scanning capability, a performance capability, an editing capability and/or a preprocessing capability, among other examples), and/or other information associated with the reader that performed a read operation in a corresponding observation. The quantity of reads may be indicative of a quantity of images captured or processed during the corresponding observation. The processing techniques performed may be indicative of types of processing techniques that were used to analyze captured images for individual reads of the corresponding observation. As shown, for a first observation, the first feature may have a value of "R1" (e.g., a barcode reader identified by R1 performed a read operation associated with the first observation), the second feature may have a value of "10" (e.g., 10 images were read during the read operation of the first observation) performed during, the third feature may have a value of "P1.1-P1.10" (e.g., processes P1.1 through P1.10 were respectively performed on the 10 images of the read operation), and so on. These features and feature values are provided as examples and may differ in other examples. For example, the feature set may include one or more of the following features: types of reads performed, types of printing anomalies detected, types of printing used to print the barcodes in the set of observations, types of barcodes (e.g., whether a printed barcode or etched barcode and/or whether a one-dimensional barcode or two-dimensional barcode, among other variations of types of barcodes) in the set of observations, age or usage information associated with printers in the set of observations, and so on.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is a status associated with a printer ("Status"), which has a value of "Issue_1" for the first observation and "Issue_2" for the second observation. The statuses of the first observation and the second observation may be indicative of types of printing issues that may cause or may lead to a printer associated with the first observation and/or the second observation printing barcodes that are or will be unreadable. Such printing issues may be associated with wear and tear on the printer, such as the one or more printing issues described elsewhere herein.

The target variable may represent a value that a machine learning model is being trained to predict (e.g., a specific issue associated with a printer that printed a barcode), and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a random-forest algorithm, a neural network algorithm, a k-nearest neighbor algorithm, a support vector machine algorithm, or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of a reader identifier, a second feature of a quantity of reads, a third feature of processing techniques performed in association with the reads, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of Issue_N for the target variable of a status associated with a printer of the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to perform an action or process to address an issue (e.g., an issue identified by Issue_N) with the printer of the new observation, a recommendation to shut down the printer, and so on. The first automated action may include, for example, causing the printer to shutdown to prevent the printer from printing more barcodes, causing the printer to perform an operation to address the issue (e.g., an operation to address the issue identified by Issue_N), and so on.

As another example, if the machine learning system were to predict a value of Issue_1 for the target variable of the status associated with the printer, then the machine learning system may provide a second (e.g., different) recommendation (e.g., a recommendation to address an issue identified by Issue_1 rather than the recommendation to address the issue identified by Issue_N) and/or may perform or cause performance of a second (e.g., different) automated action (e.g., an automated action to address identified by Issue_1 rather than the automated action to address the issue identified by Issue_N).

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster (e.g., a cluster associated with a status of Issue_N), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster associated with a status of Issue_1), then the machine learning system may provide a second (e.g., different) recommendation, such as the second recommendation indicated above, and/or may perform or cause performance of a second (e.g., different) automated action, such as the second automated action indicated above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above. For example, the recommendations associated with addressing an issue associated with a printer may include a recommendation to clean the printer, a recommendation to realign a component of the printer, a recommendation to service the printer, a recommendation to replace printing medium of the printer, replacing ink in a printer, and so on. The actions associated with addressing an issue associated with a printer may include, for example, automatically cleaning a printhead of the printer, automatically replacing an ink cartridge in the printer, automatically aligning a component of the printer, automatically replacing a printing medium of the printer, and so on. The clusters associated with a status may include, for example, a cluster of observations associated with a certain printhead issue associated with a printer (e.g., dirty, clogged, and/or broken), a cluster of observations associated with a certain misaligned component of a printer (e.g., a misaligned component, a misaligned printhead, and/or a misaligned ink cartridge), a cluster of observations associated with a certain damaged component of a printer (e.g., a damaged feed component, a damaged printhead, a damaged ink cartridge), and/or a cluster of observations associated with a certain print medium issue (e.g., wrong type, wrinkled, and/or damaged), among other examples.

In this way, the machine learning system may apply a rigorous and automated process to utilize read data associated with a read operation of a barcode to detect and/or manage a printer status associated with a printer that printed the barcode. The machine learning system enables recognition and/or identification of tens, hundreds, thousands, or millions of features and/or feature values for tens, hundreds, thousands, or millions of observations, thereby increasing accuracy and consistency and reducing delay associated with detecting or predicting a printing anomaly relative to requiring computing resources to be allocated for tens, hundreds, or thousands of operators to manually detect or predict a printing anomaly using the features or feature values.

As indicated above, FIG. 4 is provided as an example. Other examples may differ from what is described in connection with FIG. 4.

Figure 5:
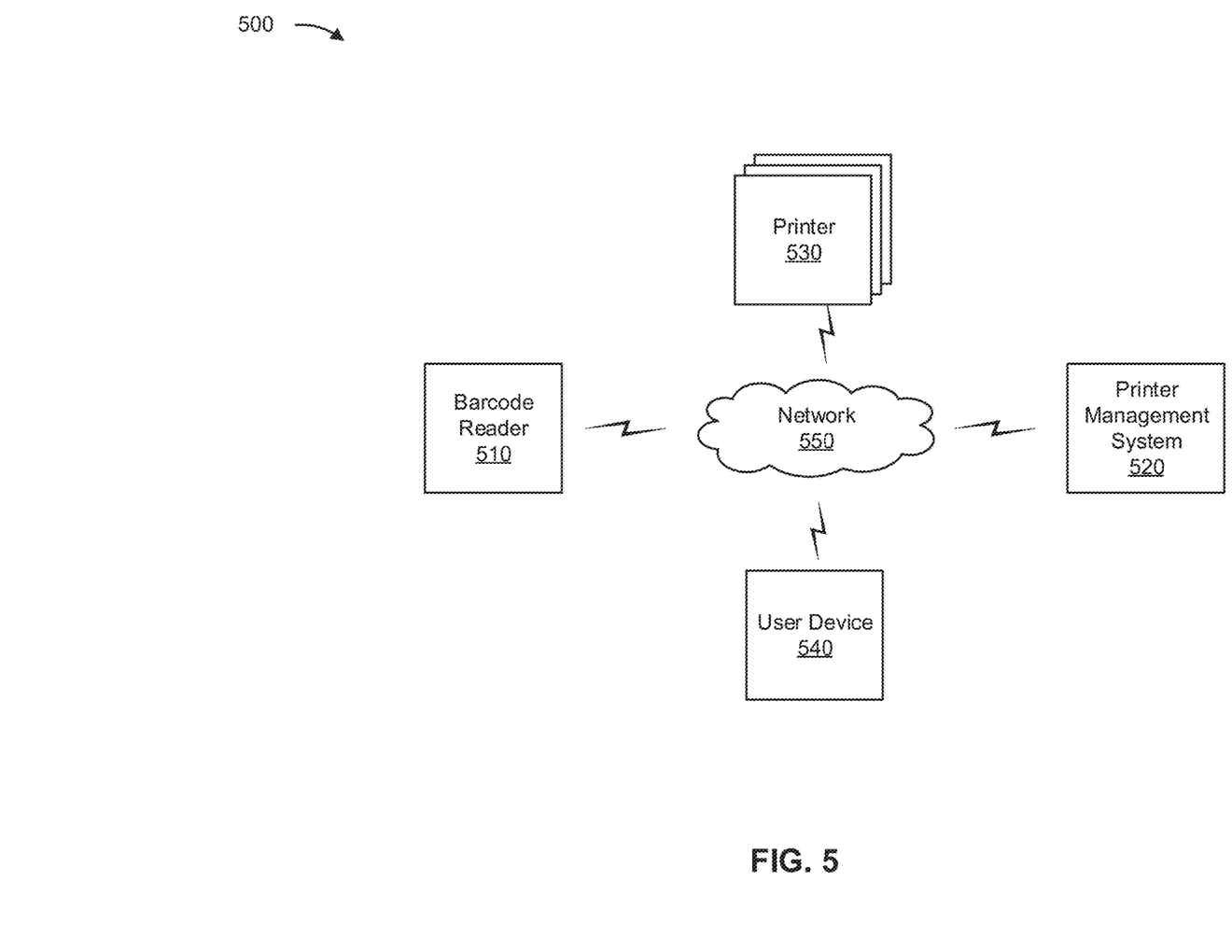
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a barcode reader 510, a printer management system 520, one or more printers 530, and a network 550. Devices of environment 500 may interconnect via wired connections, wireless connections, or a combination of wired and wireless connections.

The barcode reader 510 includes one or more devices capable of receiving, generating, storing, processing, and/or providing information associated with reading a barcode and/or detecting a printing anomaly associated with a barcode, as described elsewhere herein. The barcode reader 510 may include a reader device (e.g., a camera, scanner, or other image sensor device), a communication device, and/or a computing device. For example, the barcode reader 510 may include a wireless communication device, a mobile phone, a user equipment, tablet computer, a wearable communication device (e.g., a smart wristwatch, a pair of smart eyeglasses, a head mounted display, or a virtual reality headset), or a similar type of device.

The printer management system 520 includes one or more devices capable of receiving, generating, storing, processing, providing, and/or routing information associated with detecting a printing anomaly associated with a barcode using a barcode reader, as described elsewhere herein. The printer management system 520 may include a communication device and/or a computing device. For example, the printer management system 520 may include a server, such as an application server, a client server, a web server, a database server, a host server, a proxy server, a virtual server (e.g., executing on computing hardware), or a server in a cloud computing system. In some implementations, the printer management system 520 includes computing hardware used in a cloud computing environment.

The printer 530 includes one or more devices capable of receiving, generating, storing, processing, and/or providing information associated with printing a barcode that is analyzed using the barcode reader 510 and/or the printer management system 520 to detect a printing anomaly, as described elsewhere herein. The printer 530 may include a printing device, a communication device and/or a computing device. For example, the printer 530 may include an inkjet printer, a laser printer, a thermal printer, or a similar type of device.

The user device 540 includes one or more devices capable of receiving, generating, storing, processing, and/or providing information associated with managing a printing anomaly, an anomaly status associated with a barcode reader, and/or a printer status, as described elsewhere herein. The user device 540 may include a communication device and/or a computing device. For example, the user device 540 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 550 includes one or more wired and/or wireless networks. For example, the network 550 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 550 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
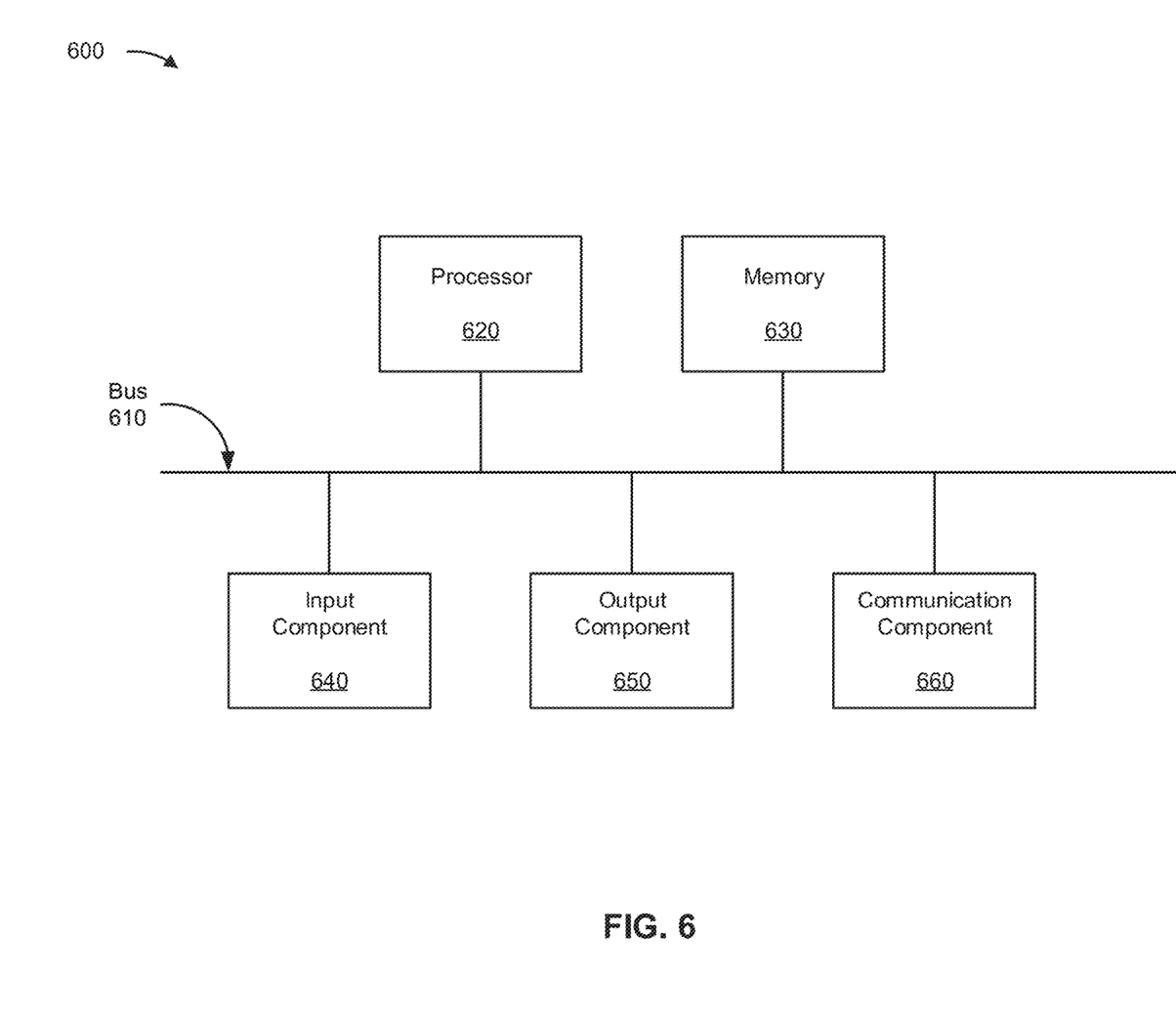
FIG. 6 is a diagram of example components of one or more devices of FIG. 5.

FIG. 6 is a diagram of example components of a device 600, which may correspond to the barcode reader 510, the printer management system 520, and/or the printer 530. In some implementations, the barcode reader 510, the printer management system 520, and/or the printer 530 may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a fieldprogrammable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
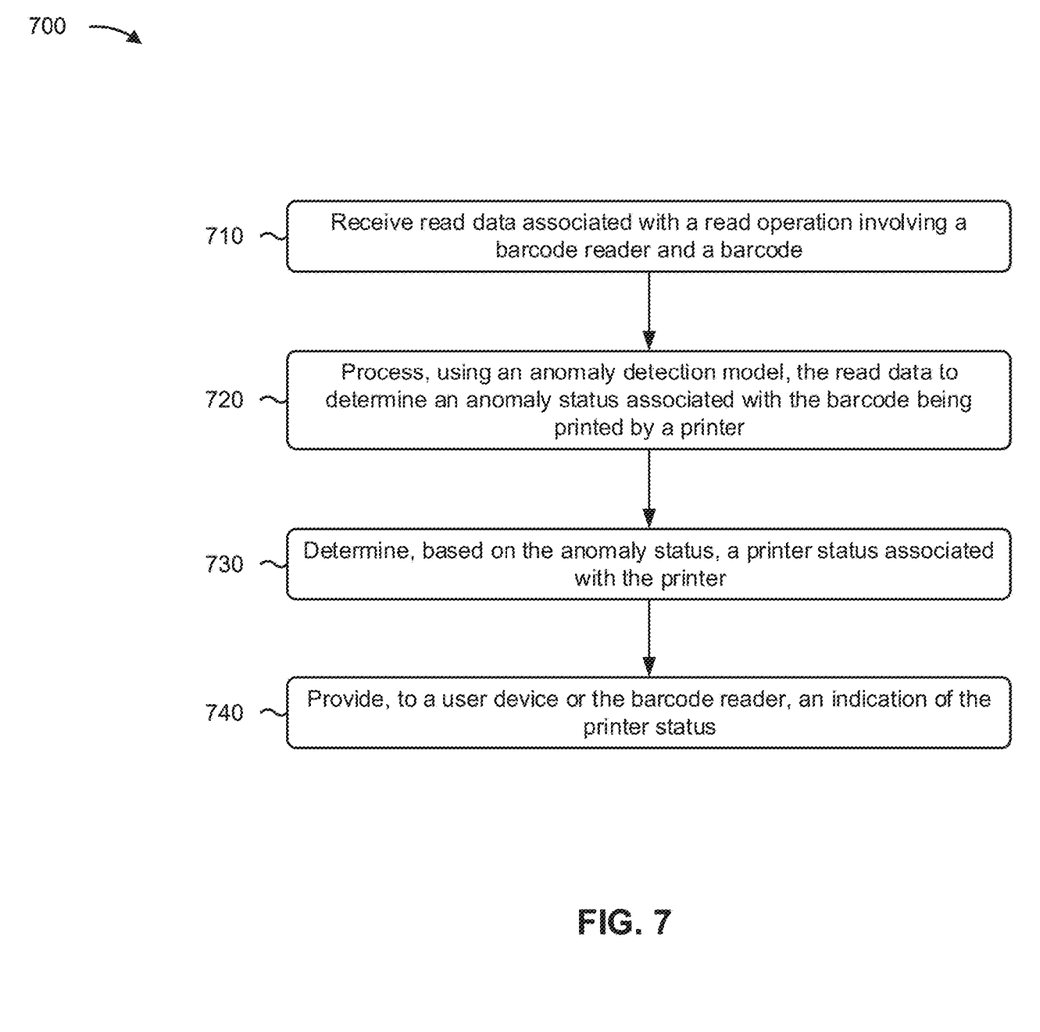
FIG. 7 is a flowchart of an example processes relating to detecting a printing anomaly associated with a barcode using a barcode reader.

FIG. 7 is a flowchart of an example process 700 associated with detecting printing anomalies using a barcode reader. In some implementations, one or more process blocks of FIG. 7 may be performed by a barcode reader (e.g., the barcode reader 510). In some implementations, one or more process blocks of FIG. 7 may be performed by another device or a group of devices separate from or including the barcode reader, such as a printer management system (e.g., the printer management system 520) and/or a printer (e.g., the printer 530). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving read data associated with a read operation involving a barcode reader and a barcode (block 710). For example, the barcode reader may receive read data associated with a read operation involving a barcode reader and a barcode, as described above. In some implementations, the read data includes image data associated with one or more images captured in association with the read operation and/or decoding metric information associated with decoding the barcode based on the one or more images.

The read operation may be performed based on detecting that the printer printed the barcode. In some implementations, the read operation is iteratively performed for less than or equal to a threshold quantity of images, and wherein the decoding metric information indicates that the barcode could not be decoded from the threshold quantity of images. In some implementations, the decoding metric information indicates at least one of whether the barcode was successfully decoded, a quantity of images that were captured to successfully decode the barcode, or a quantity of images that were captured that did not result in a successful decode of the barcode.

As further shown in FIG. 7, process 700 may include processing, using an anomaly detection model, the read data to determine an anomaly status associated with the barcode being printed by a printer (block 720). For example, the barcode reader may process, using an anomaly detection model, the read data to determine an anomaly status associated with the barcode being printed by a printer, as described above. In some implementations, the anomaly detection model is trained based on reference decoding metric information associated with corresponding reference images that depict barcodes associated with one or more printing anomalies.

In some implementations, the anomaly status indicates whether the barcode is associated with a particular printing anomaly of the one or more printing anomalies, and wherein the printer status indicates a type of printing issue that is associated with the particular printing anomaly.

As further shown in FIG. 7, process 700 may include determining, based on the anomaly status, a printer status associated with the printer (block 730). For example, the barcode reader may determine, based on the anomaly status, a printer status associated with the printer, as described above.

As further shown in FIG. 7, process 700 may include providing, to a user device or the barcode reader, an indication of the printer status (block 740). For example, the barcode reader may provide, to a user device or the barcode reader, an indication of the printer status, as described above.

In some implementations, the barcode reader may output, via a display of the barcode reader, an alert that identifies the printer status, or transmitting, to the user device, a notification that identifies the printer status. The anomaly detection model may include a machine learning model that is configured to be updated based on the read operation and feedback associated with the indication.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A device, comprising:
one or more memories; and
one or more processors, coupled to the one or more memories, configured to:
receive read data associated with a read operation involving a barcode reader and a barcode,
wherein the read data includes:
image data associated with one or more images captured in association with the read operation, and
decoding metric information associated with decoding the barcode based on the one or more images;
process, using an anomaly detection model, the read data to determine an anomaly status associated with the barcode being printed by a printer,
wherein the anomaly detection model is trained based on reference decoding metric information associated with corresponding reference images that depict barcodes associated with one or more printing anomalies; and
determine, based on the anomaly status, a printer status associated with the printer;
provide, to a user device or the barcode reader, an indication of the printer status;
wherein the decoding metric information indicates at least one of:
whether the barcode was successfully decoded,
a quantity of images that were captured to successfully decode the barcode, or
a quantity of images that were captured that did not result in a successful decode of the barcode.

2. The device of claim 1, wherein the read operation is performed based on detecting that the printer printed the barcode.

3. The device of claim 1, wherein the read operation is iteratively performed for less than or equal to a threshold quantity of images, and
wherein the decoding metric information indicates that the barcode could not be decoded from the threshold quantity of images.

4. The device of claim 1, wherein the anomaly status indicates whether the barcode is associated with a particular printing anomaly of the one or more printing anomalies, and
wherein the printer status indicates a type of printing issue that is associated with the particular printing anomaly.

5. The device of claim 1, wherein the one or more processors, to provide the indication associated with the printer status, are configured to:
output, via a display of the barcode reader, an alert that identifies the printer status; or
transmit, to the user device, a notification that identifies the printer status.

6. The device of claim 1, wherein the anomaly detection model comprises a machine learning model that is configured to be updated based on the read operation and feedback associated with the indication.

7. A system comprising:
a barcode reader;
a printer; and
a controller configured to:
cause the barcode reader to perform a read operation associated with reading a barcode;
receive, from the barcode reader, read data associated with the read operation,
wherein the read data includes decoding metric information associated with decoding the barcode based on one or more images captured in association with the read operation;
process, using an anomaly detection model, the read data to determine an anomaly status associated with the barcode being printed by a printer,
wherein the anomaly detection model is trained based on reference decoding metric information associated with reference images that depict barcodes, and
wherein the anomaly detection model is configured to indicate a printer status associated with the printer based on the anomaly status; and
provide an indication associated with the printer status;
wherein the decoding metric information indicates at least one of:
a quantity of images that were captured to successfully decode the barcode,
a quantity of images that were captured that did not result in a successful decode of the barcode,
an autotuning technique that was used to modify an image used in a decoding operation that successfully decoded the barcode,
an autotuning technique associated with one or more decoding operations that were not successful in decoding the barcode,
a setting of a camera, of the barcode reader, used to capture an image used in a decoding operation that successfully decoded the barcode, or
a setting of a camera, of the barcode reader, used to capture an image used in one or more decoding operations that were not successful in decoding the barcode.

8. The system of claim 7, wherein the read data includes image data associated with the one or more images.

9. The system of claim 7, wherein the anomaly status indicates whether the barcode is associated with a particular printing anomaly, and
wherein the printer status indicates a type of printing issue that is associated with the particular printing anomaly.

10. The system of claim 7, wherein the controller, to provide the indication, is configured to at least one of:
transmit, to the barcode reader, an alert that identifies that the printer is associated with the printer status,
transmit, to a printer management system associated with the printer, a notification that indicates that the printer is associated with the printer status, or
transmit, to the printer management system, a notification that the barcode is associated with the anomaly status.

11. The system of claim 7, wherein the anomaly detection model comprises a neural network.

12. A device, comprising:
one or more memories; and
one or more processors, coupled to the one or more memories, configured to:
receive read data associated with a read operation involving a barcode reader and a barcode, wherein the read data includes:
   image data associated with one or more images captured in association with the read operation, and
   decoding metric information associated with decoding the barcode based on the one or more images;
process, using an anomaly detection model, the read data to determine an anomaly status associated with the barcode being printed by a printer,
   wherein the anomaly detection model is trained based on reference decoding metric information associated with corresponding reference images that depict barcodes associated with one or more printing anomalies;
determine, based on the anomaly status, a printer status associated with the printer; and
provide, to a user device or the barcode reader, an indication of the printer status;
   wherein the read operation is iteratively performed for less than or equal to a threshold quantity of images, and
   wherein the decoding metric information indicates that the barcode could not be decoded from the threshold quantity of images.

* * * * *